United States Patent [19]
Arenson

[11] 3,718,942
[45] March 6, 1973

[54] CASTER ASSEMBLY WITH INTEGRAL HORN AND PINTLE AND METHOD OF MAKING SAME

[76] Inventor: Herbert Arenson, 9999 West 75th Street, Shawnee Mission, Kans. 66204

[22] Filed: Aug. 14, 1970

[21] Appl. No.: 63,814

Related U.S. Application Data

[63] Continuation-in-part of Ser. No. 3,431, Jan. 16, 1970, abandoned.

[52] U.S. Cl. ................................................. 16/37
[51] Int. Cl. ........................................... B60b 33/00
[58] Field of Search ............ 16/18, 31, 30, 37, 29, 40, 16/43

[56] References Cited

UNITED STATES PATENTS

| | | | |
|---|---|---|---|
| 3,537,125 | 11/1970 | Arenson | 16/31 |
| 1,929,743 | 10/1933 | Jarvis et al. | 16/38 |

Primary Examiner—Bobby R. Gay
Assistant Examiner—Doris L. Troutman
Attorney—Fishburn, Gold and Litman

[57] ABSTRACT

A caster of molded parts and method of making same wherein the caster includes an integral pintle and horn having axle portions all molded of a plastic composition and mounting a wheel. A mounting member for supporting the pintle in a leg of furniture or the like, such as a sleeve having a flange at one end and a thickened portion at the other end for engaging a shoulder on the pintle to retain the sleeve and pintle assembled. The method includes the molding of the pintle and horn in an integral structure substantially in its final shape with the horn and arm portions thereof preferably having axle portions extending from the arms, spreading the arm portions to permit placing a wheel on the axle portions, said molded portions being of a suitable shock and wear resistant material, such as acetal resin or nylon.

7 Claims, 10 Drawing Figures

INVENTOR.
Herbert Arenson

BY Frishberg, Gold & Litman
ATTORNEYS

INVENTOR.
Herbert Arenson
BY
ATTORNEYS

CASTER ASSEMBLY WITH INTEGRAL HORN AND PINTLE AND METHOD OF MAKING SAME

This application is a continuation-in-part of my copending application, Ser. No. 3431, filed Jan. 16, 1970 now abandoned.

The present invention relates to furniture casters and more particularly to a one piece molded U-shaped member having integral pintle, horn, and axle.

The principal objects of the present invention are: to provide a caster assembly of molded plastic parts including an integral pintle and horn, molded substantially in final shape; to provide such a caster assembly of wear resistant, shock absorbing material with the portions formed and joined to cooperate in resisting loads, wherein the resiliency of suitable plastic material enables the caster assembly to absorb shocks and instantaneously return to normal shape; to provide such a caster assembly and method of making same wherein the pintle and horn is molded with the horn and arms thereof substantially in final shape having the pintle and arms extending in opposite directions from a bight portion of the horn and with the arms near parallel relation with aligned axle portions extending toward each other from facing interior surfaces of the arms with the mold parts separated in a single linear movement for removing the pintle and horn from the mold cavity; to provide such a method of making a caster assembly wherein the arms are flexible to be bent outwardly to permit installation of a wheel on the axle portions and then the structure is locked at the axle portions to retain the wheel between the arm portions; to provide such a structure with cooperating engageable lock members on adjacent ends of the axle portions which latch together in interlocking engagement in response to pressure on the arms to retain said axle portions in aligned relation rotatably supporting the wheel; to provide such a caster assembly wherein the pintle is rotatably mounted in a sleeve with the sleeve having one end thereof engaging an enlarged upper end of the pintle and being adapted to be mounted in a leg of an article of furniture or the like, said sleeve having portions engaging said leg to prevent relative rotation therebetween; to provide such a caster assembly wherein the sleeve has an annular flange with bearing portions thereon engaging the bight of the caster horn radially outwardly from the axis of the pintle; and to provide such a caster assembly and method of making the pintle, horn, and axle of plastic that is economical for quantity production of a caster that is sturdy, long wearing and shock resistant and particularly well adapted for the proposed use.

Other objects and advantages of this invention will become apparent from the following description taken in connection with the accompanying drawings wherein are set forth by way of illustration and examples certain embodiments of this invention.

Figure 1:
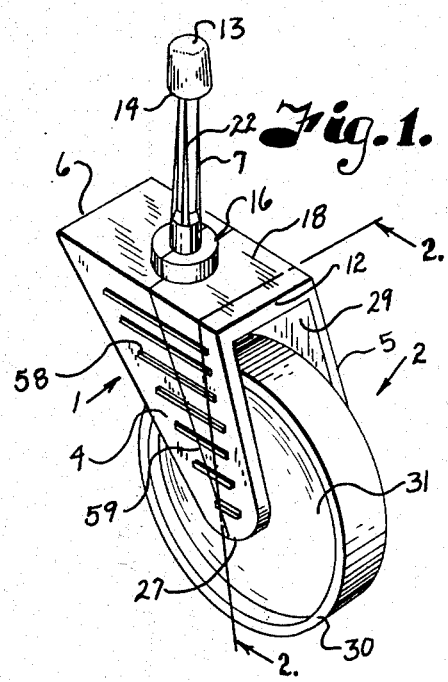
FIG. 1 is a perspective view of a caster assembly embodying features of the present invention.
Figure 10:
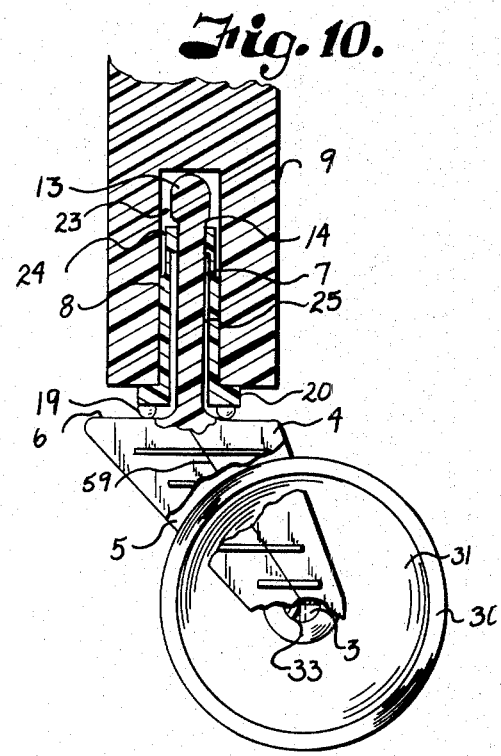
FIG. 10 is a longitudinal sectional view through a modified caster assembly showing a modified pintle and mounting sleeve and plain axle ends.

Referring more in detail to the drawings:

The reference numeral 1 generally designates a caster assembly including a wheel 2 rotatably mounted on an axle 3 carried by substantially parallel arms 4 and 5 of a horn 6 having an upstanding pintle 7 thereon which is rotatably mounted in a suitable bearing member, such as a sleeve 8, adapted to be secured within a bottom end of a piece of furniture or other article to be supported, as for example, in a leg 9 of such an article of furniture. Aligned axle portions 10 and 11 are integral with the horn and pintle structure for resulting strength as well as economy in manufacture. In the illustrated structure, the axle portions 10 and 11 are integral with the arms 4 and 5, respectively. The pintle 7 is integral with the horn 6 and extends upwardly from a bight or plate portion 12 thereof. While the pin or pintle 7 may take different forms, it is preferred that it be an elongate generally cylindrical member relatively small in diameter whereby the pintle 7 can be mounted within small leg structures and the like, as for example, the diameter may be between ¼ to ⅜ inches. An upper portion or end 13 of the pintle 7 preferably is enlarged to form a ball having a downwardly facing shoulder 14 for aiding in retaining the sleeve 8 thereon, as later described. A lower portion or end 16 of the pintle 7 is generally cylindrical and enlarged to be rotatably received within a lower end of the sleeve 8, as later described. An upper face 18 of the bight or plate portion 12 extends outwardly from the enlarged lower end portion 16 of the pintle 7 and is substantially flat to provide a bearing surface adapted to be engaged by spaced bearing points 19 on the under face of an annular flange 20 of the sleeve 8.

In the illustrated structure, the sleeve 8 has a generally cylindrical bore 21 adapted to be rotatably mounted on the pintle 7 and has a plurality of circumferentially spaced and radially outwardly extending ribs 22 arranged longitudinally of the sleeve 8 and adapted to engage within a bore 23 in a leg 9 of an article of furniture to be supported. The bore 21 through the sleeve 8 is larger than the pintle 7 between the shoulder 14 and the enlarged end 16 and smaller than the enlarged end portions 13 and 16. An upper end of the sleeve 8 is preferably of reduced diameter to form a thickened portion 24 for engaging the shoulder 14 at the underside of the enlarged upper portion 13 of the pintle 7. The ribs 22 have their upper ends uniformly spaced from the thickened portion 24 to form an intermediate or resilient portion 25 positioned between the thickened portion 24 and the upper ends of the ribs 22 whereby the sleeve 8 may be passed over the enlarged upper end portion 13 of the pintle 7 and snap into engagement with the shoulder 14. The annular flange 20 has a recess 26 therein coaxial with and concentric with the bore 21 thereby forming a counterbore having a surface for engaging the exterior surface of the enlarged lower end 16 to rotatably guide the sleeve 8 and to position the bearing points 19 in supporting engagement with the upper face 18 of the bight or plate portion 12 of the horn 6.

The arms 4 and 5 of the horn 6 extend from opposite side edges of the bight or plate portion 12 in substantially parallel relation with the arms terminating in a rounded end 27 preferably on a radius from the longitudinal axis of the axle 3. The spacing between inner or facing surfaces 28 and 29 of the arms 4 and 5, respectively, is such that the wheel 2 is freely movable therebetween. The wheel 2 has a rim portion 30 connected by a web 31 with a hub 32 having a bearing bore 33 therethrough adapted to receive the axle member 3 for rotatably mounting the wheel 2 thereon. The surfaces formed by the bore 33 serves as the bearing for the wheel. The hub 32 is of a length to be freely movable between the inner faces 28 and 29 and the rim portion 30 has a width slightly less than the length of the hub 32 whereby the rim portion 30 will be free to travel between the inner faces 28 and 29 even when either end of the hub 32 is in engagement with either of the inner faces 28 or 29.

The axle portions 10 and 11 are inwardly projecting parts on the arms 4 and 5, respectively, and are cylindrical members of suitable size whereby when positioned in the bore 33 of the wheel hub 32 there is only bearing clearance so the wheel 2 is freely rotatable thereon. The adjacent end portions of the axle portions 10 and 11 have interlocking lock or fastener members 34 which hold the axle portions together in coaxial relation when engaged by movement in response to inward pressure on the arms 4 and 5. The lock members are in the form of lugs, and in the illustrated structure, each is slightly less than a quadrant of the respective axle portion in cross section with two arranged in diametrical cross section on each axle portion. The lock members or lugs 35 and 36 on one axle portion 10 are arranged to move between the lock members on lugs 37 and 38 on the other axle portion 11 when moved to engaged position. Each of the lugs on the two axle portions have a face 39 substantially on a diametrical plane 40 parallel with the bight or plate portion 12. A lock lug 35 on one axle portion 10 at one side of said plane 40 interlocks with a lock lug 37 on the other axle portion 5, and the adjacent faces 41 of said two cooperating lugs 35 and 37 each have a tongue or detent 42 at the outer end formed by an under cut recess 43 that extends to the end surface 44 of the cylindrical portion of the respective axle portion. The detent or tongue 42 extends beyond the diametrical plane 45 perpendicular to the first named diametrical plane 40 so that the outer edge of the tongue 42 is beyond said second diametrical plane substantially the same distance as the surface 46 of the recess 43, and the detent or tongue 42 is such that it will deflect to allow one detent or tongue to pass the other when the axle portions 10 and 11 are pressed together to move the detent portions into interlocking engagement wherein the shoulders 47 are engaged. The other lug portions 36 and 38 on the opposite side of the first named diametrical plane 40 are similar except the detent or tongue is inclined presenting an inclined surface 49 so that when the axle portions are moved to effect locking engagement the inclined surface 49 of one lug 36 cooperates with the inclined surface on the other lug 38 so that when forced together the sliding movement of the inclined surfaces 49 provide a twisting action on the respective axle portions turning them so the detents 42 and 48 will pass, and on disengagement of said inclined surfaces the force being released, the axle portions untwist and effect interlocking engagement of the shoulders 47 of the cooperating lugs to provide a positive lock holding the axle portions together and preventing the arms 4 and 5 from spreading under load.

In the making of the caster assembly 1, such as illustrated and described, the pintle 7 and the horn 6 are molded in one piece, as by injection molding, and preferably of a material, such as nylon or acetal resin, that is capable of high impact resistance so as to withstand impacts that heretofore have caused displacement of material or cold flow in metal horns and stem assemblies. In the molding, the plate or bight 10, the pintle 7, the arms 4 and 5, and axle portions are molded in their finished form with the pintle 7 extending substantially perpendicular from the bight 10 and the arms 4 and 5 extending in the opposite direction and diverging so the locking lugs 35 and 36 of the axle portions 10 and the locking lugs 37 and 38 of the axle portion 11 are slightly spaced apart. The bight 10 and arms 4 and 5 form a generally U-shaped member having the integral axle portions 10 and 11 thereon perpendicular to the arms 4 and 5, respectively. The mold 52 is formed of two movable portions 53 and 54, each having mating cavities 55 and 56, respectively, and central portions therein conforming to portions of the finished horn, pintle, and axle structure, and each of the mold portions 53 and 54 have at least one suitable passage communicating with the cavities 55 and 56, respectively, for flow of the nylon or acetal resin therethrough by injection molding. The mold portions 53 and 54 are filled and vented as in conventional practice.

Each of the mold portions 53 and 54 form the exterior surface of one-half of the axle portions 10 and 11 whereby the mold portions 53 and 54 may be easily separated and the integral pintle, horn, and axle may be easily removed. The mold portions 53 and 54 have engaging surfaces forming a parting line 59 at diametrically opposed edges of the axle portions 10 and 11 which is normal or perpendicular to the direction of separation of the mold portions 53 and 54.

The faces 39 of the lugs 35, 36, 37, and 38, adjacent the first diametrical plane 40 are in the line of movement of separation of the mold portions. The lugs 35 and 37 are provided by cavities 60 in the respective mold portion 53 and the faces of the lugs forming the tongues or detents thereof are provided by surfaces on the other mold portion 54 adjacent the parting lines of the mold portion. The lugs 36 and 38 are provided by cavities in the mold portion 54 and the faces of said lugs forming the tongues or detents thereof are provided by surfaces of the mold portion 53 so that the lugs and the detents thereon are formed in mold portions that are separated by a single linear movement thereof.

Molding the integral pintle 7 and horn 6 is accomplished in the mold 52 by forcing plastic under pressure into the mating cavities 55 and 56 of the two-piece mold 52 and setting of the plastic. The engaging surfaces of the mold portions forms the parting line 59 at diametrically opposed surfaces of the axle portions 10 and 11 and in the structure illustrated at diametrically opposed surfaces of the pintle 7 and parallel with a longitudinal axis thereof. The mold portions 53 and 54 are separated in a single linear movement having a direction parallel with the surfaces of the arms 4 and 5 of the horn 6. The separating of the two portions or pieces 53 and 54 of the mold 52 is in a direction normal or perpendicular to the axle portions 10 and 11. The parting lines 59 on facing interior surfaces 28 and 29 of the arms 4 and 5 of the horn 6 are in a plane normal to the plane of the bight portion 12 thereby defining a plane normal to the direction of separation of the mold portions 53 and 54. In the structure illustrated, the parting lines on the axle portions 10 and 11 are in the plane defined by the parting lines on the facing surfaces of the arms of the horn and the parting lines on the pintle 7 define a plane normal to the surfaces of the bight portion 12 of the horn 6 and parallel to and spaced from the plane defined by the parting lines on the facing surfaces of the arms 4 and 5 of the horn 6. A portion of the parting line 59 on exterior surfaces of the arms 4 and 5 of the horn 6 is in each of the planes defined by the parting lines on on the facing surfaces of the arms 4 and 5 and the plane defined by the parting lines on the pintle 7, respectively. A portion of the parting line on the exterior surfaces of the arms of the horn 6 extends between said parallel defined planes, and the portion of the parting line on the exterior surfaces of the arms extending between the parallel planes defined by the parting lines on the pintle 7 and the parting lines on the interior facing surfaces of the arms intersect the defined planes at an angle other than normal thereto.

It is preferred that the wheel 2 also be made of plastic, as for example, nylon or acetal resin. The arms 4 and 5 are resilient and may be spread apart to spread apart the free ends of the axle portions 10 and 11 to move into the bore 33 of the wheel 2 when the arms 4 and 5 are released. After the wheel is on the axle portions 10 and 11 axial pressure is applied to the arms 4 and 5 forcing the axle portions together and causing the lugs to engage and move the detents of one past the other so the shoulders 48 have interlocking engagement positively holding the axle portions together. When assembled the ends of the lugs are near the surfaces at the ends of the cylindrical portion to maintain spacing of the arms 4 and 5.

The sleeve 8 may be of any suitable material and preferably is molded of a resin, such as nylon or the like, and is sleeved on the pintle 7 with the resilient portion 25 expanding to pass over the enlarged upper end portion 13 of the pintle 7 to permit the thickened portion 24 of the sleeve 8 to expand to pass over the thickened upper end portion 13 and to snap into engagement with the shoulder 14 thereof, upon clearing the enlarged upper end 13. In this position, the bearing surface of the recess 26 engages the exterior surface of the enlarged lower end 16 of the pintle 7 to position the bearing points 19 in engagement with the upper face 18 of the bight or plate portion 12 to provide load bearing contact for reduced friction in the swinging action of the caster, wherein the pintle 7 rotates within the sleeve 8.

Figure 3:
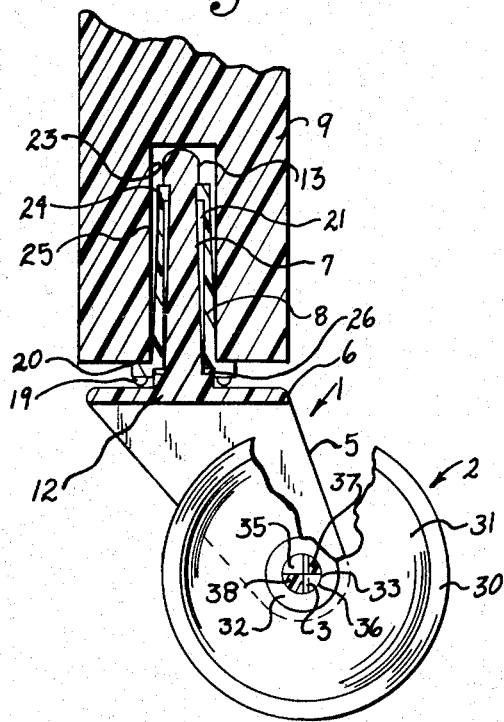
FIG. 3 is a longitudinal sectional view through the caster assembly taken on line 3—3, FIG. 2 and showing mounting thereof in a furniture leg.
Figure 2:
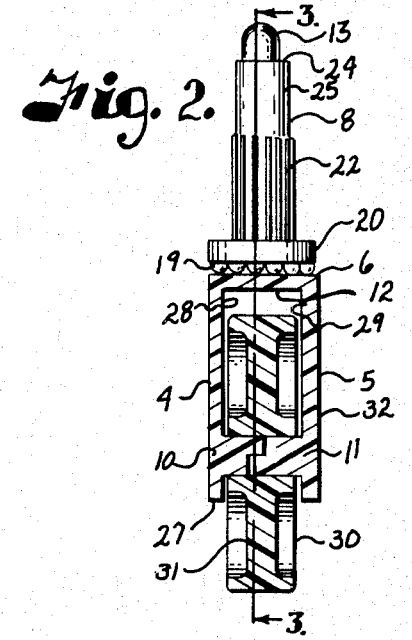
FIG. 2 is a transverse sectional view of the caster assembly through the horn and wheel taken on line 2—2, FIG. 1.
Figure 4:
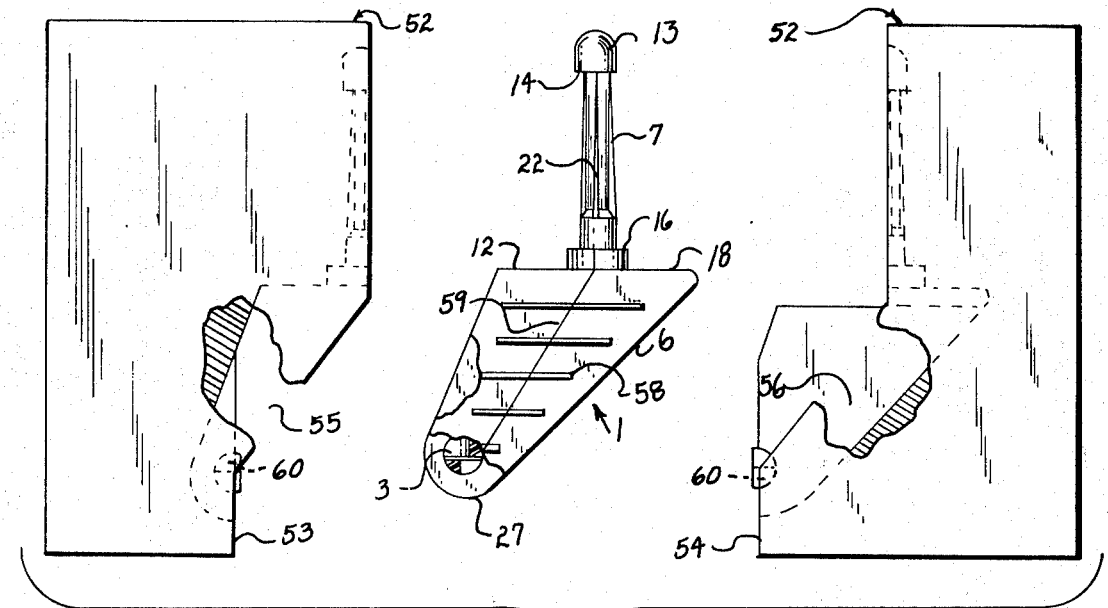
FIG. 4 is an exploded elevational view of a mold for forming the integral pintle and horn structure.
Figure 5:
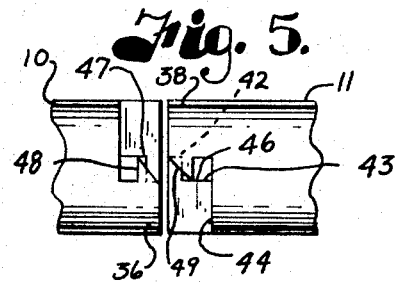
FIG. 5 is an enlarged partial bottom view of the horn axle.
Figure 6:
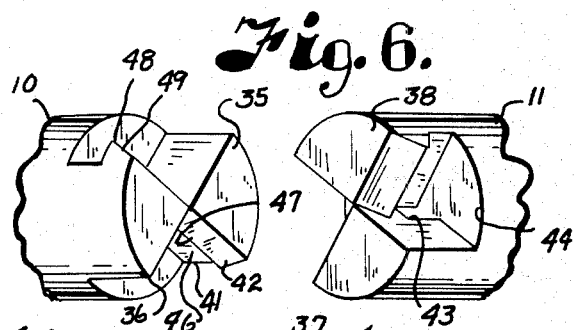
FIG. 6 is an enlarged perspective view of ends of axle portions showing lock members in spaced relation.
Figure 7:
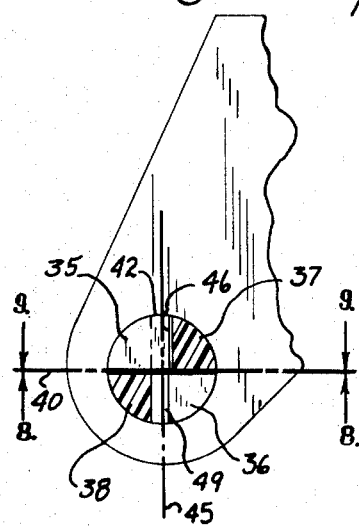
FIG. 7 is an enlarged sectional view of axle lock members engaged.
Figure 8:
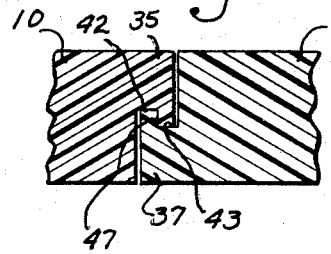
FIG. 8 is an enlarged sectional view through lock members in engaged position taken on line 8—8, FIG. 7.
Figure 9:
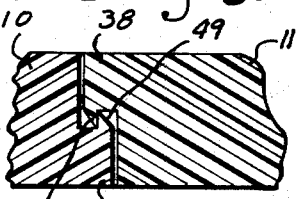
FIG. 9 is an enlarged sectional view through lock members in engaged position taken on line 9—9, FIG. 7.

When assembling the caster assembly 1 into an article of furniture, the sleeve 8 is pressed into the bore 23 with the ribs 22 engaging the wall thereof to hold the sleeve 8 against rotation within the bore 23 and the lower part of leg 9 engages the upper surface of the flange 20, as illustrated in FIG. 3, for proper load distribution thereon with the engagement being preferably above the bearing points 19 of the flange 20. This arrangement provides a load distribution that cooperates in resisting any deflection and in providing a long wearing efficient caster with impact resistance. Also, the caster assembly 1 has a minimum of parts each of which is easily molded for high production and economical manufacture.

Exterior surfaces of the arms 4 and 5 may have suitable decorative treatment thereon, such as a plurality of spaced parallel ribs 62, therefore, each of the cavities 55 and 56 have complementary recesses therein to form the ribs 62. When the ribs 62 are formed on the exterior surfaces of the arms 4 and 5, the direction of separation of the mold portions 53 and 54 is parallel with the ribs 62.

In the form of the invention illustrated in FIG. 11, the recess 26 is omitted in the lower end of the sleeve 8 and the pintle 7 joins with the bight or plate portion with a large radius so that the bearing points 19 are the load bearing portions of the sleeve engaging the upper surface of the bight or plate portion 12. Also, in this form of the invention, the horn has axle portions extending inwardly from arms 4 and 5 and terminating in plain or flat abutting end surfaces, which substantially engage when the arms 4 and 5 are released after assembling a wheel on the axle part. The free ends of the axle portions are preferably joined or welded as by sonic welding to hold the arms 4 and 5 in parallel relation under load.

It is to be understood that while I have illustrated and described certain forms of my invention, it is not to be limited to the specific forms or arrangements of parts herein described and shown.

What I claim and desire to secure by Letters Patent is:

1. In a caster assembly for mounting a caster wheel,
   a. an integral pintle, horn, and axle all of a plastic composition,
   b. said horn having a bight portion and a pair of spaced substantially parallel arms depending from said bight portion,
   c. said pintle, horn, and axle being molded substantially in final shape,
   d. said axle being integral with said arms of said horn and extending toward the other arm and terminating in a free end,
   e. said arms of said horn are resilient members whereby said free ends of said inwardly projecting axle portions may be spread apart to move into the caster wheel when released.

2. A caster assembly as set forth in claim 1 wherein,
   a. said axle is formed of an inwardly projecting axle portion integral with each arm of said horn, said axle portions are aligned and have free ends thereof in engagement for maintaining a minimum spacing between said arms and for providing an axle spanning the space between the arms to mount a caster wheel thereon, b. said inwardly projecting axle portions on said arms are cylindrical members having the free ends thereof in engagement, c. said arms of said horns are resilient member whereby said free ends of said inwardly projecting axle portions may be spread apart to move into the caster wheel when released.

3. A caster assembly as set forth in claim 2 wherein, a. said pintle is normal to the bight portion of the horn and said axle portions are normal to the arms of the horn and said axle portions are in a plane offset from a longitudinal axis of said pintle, b. said free ends of said axle portions are joined together after the caster wheel is mounted thereon to prevent said parallel arms from spreading.

4. A caster assembly as set forth in claim 2 wherein, a. said axle if formed of an inwardly projecting cylindrical axle portion integral with each arm of said horn, said axle portions having free ends and being alignable and spanning the space between the arms for mounting a caster wheel thereon, b. mating lugs on the free ends of said axle portions and extending toward the other, said mating lugs having opposed engagable detent portions, c. said arms of said horn being resilient members whereby said free ends of the axle portions are spread apart to insert a caster wheel therebetween and move into the caster wheel bore when released, said lug detects being engaged responsive to axial inward force on the arms to lock the axle portions together.

5. In a caster assembly, a. an integral member having spaced arms and inwardly projecting aligned axle portions on each arm all molded of a plastic composition, b. a wheel positioned between said arms and having a bore receiving said axle portions, c. mating lugs on adjacent ends of said axle portions, said mating lugs having opposed engagable detent portions for locking the axle portions together, d. certain of the mating lugs on one axle portion having an inclined face on the detent portion engagable by the detent portion of the mating lug on the other axle portion for applying a twisting force to the axle portions to move same and permit the detent portions to pass into locked engagement in response to axial movement of the axle portion to locked position.

6. A caster assembly as set forth in claim 5 wherein, a. each axle portion has two lugs arranged in opposed substantially quadrant portions of respective adjacent ends with lugs on one axle portion in different quadrant portions than those of the other whereby the lugs on one axle portion will move into the space between the lugs on the other axle portion, b. the inclined face on the detent portion being on two mating lugs whereby the twisting force is applied equally to each axle portion.

7. In a caster assembly for mounting a caster wheel:

a. an integral pintle, horn, and axle all of a plastic composition;

b. said horn having a bight portion and a pair of spaced substantially parallel arms depending from said bight portion;

c. said pintle, horn, and axle being molded substantially in final shape;

d. said axle being integral with an arm of said horn and extending toward the other arm and terminating in a free end;

e. said axle is formed of an inwardly projecting cylindrical axle portion integral with each arm of said horn, said axle portions having free ends and being alignable and spanning the space between the arms for mounting a caster wheel thereon;

f. mating lugs on the free ends of said axle portions and extending toward the other, said mating lugs having opposed engageable detent portions;

g. certain of the mating lugs on one axle portion having an inclined face on the detent portion engageable by the detent portion of the mating lug on the other axle portion whereby said lugs apply a twisting force to the axle portions to move same permitting the detent portions to pass each other and become engaged as the axle portions are axially moved to locked position;

h. said arms of said horn being resilient members whereby said free ends of the axle portions are spread apart to insert a caster wheel therebetween and move into the caster wheel bore when released, said lug detents being engaged responsive to axial inward force on the arms to lock the axle portions together.

* * * * *